United States Patent [19]

Sakata et al.

[11] Patent Number: 4,740,910
[45] Date of Patent: Apr. 26, 1988

[54] MULTIPROCESSOR SYSTEM

[75] Inventors: Junihiko Sakata; Takashi Hiraoka; Ikuo Uchihori, all of Tokyo, Japan

[73] Assignee: Kabushiki Kaisha Toshiba, Kawasaki, Japan

[21] Appl. No.: 878,695

[22] Filed: Jun. 26, 1986

[30] Foreign Application Priority Data

Jun. 28, 1985 [JP] Japan .............................. 60-142127

[51] Int. Cl.⁴ .............................................. G06F 9/00
[52] U.S. Cl. .................................................... 364/900
[58] Field of Search ... 364/900 MS File, 200 MS File

[56] References Cited

U.S. PATENT DOCUMENTS

| | | | |
|---|---|---|---|
| 4,096,566 | 6/1978 | Borie et al. | 364/200 |
| 4,145,739 | 3/1979 | Dunning et al. | 364/200 |
| 4,219,873 | 8/1980 | Kober et al. | 364/200 |
| 4,223,380 | 9/1980 | Antonaccio et al. | 364/200 |
| 4,228,496 | 10/1980 | Katzman et al. | 364/200 |
| 4,368,514 | 1/1983 | Persaud et al. | 364/200 |
| 4,404,628 | 9/1983 | Angelo | 364/200 |

*Primary Examiner*—Thomas M. Heckler
*Assistant Examiner*—John G. Mills
*Attorney, Agent, or Firm*—Finnegan, Henderson, Farabow, Garrett & Dunner

[57] ABSTRACT

In this invention, when a service processor must request processing to all of n processors, it supplies a processing request to one of the n processors using a 1:1 inter-processor communication instruction. The processor receiving the request from the service processor then supplies a processing request to the remaining (n−1) processors using a 1:n inter-processor communication instruction. A bus control unit for controlling a system bus has a flag indicating whether or not the 1:1 (or 1:n) inter-processor communication instruction is sent. The service processor and other processors refer to the flag. When the flag is ON, issuance of the 1:1 (or 1:n) inter-processor communication instruction is inhibited to prevent contention between a plurality of requests.

6 Claims, 4 Drawing Sheets

MULTIPROCESSOR SYSTEM

BACKGROUND OF THE INVENTION

The present invention relates to a system processing an inter-processor communication instruction from a service processor in a multiprocessor system adopting a split bus control method.

In a multiprocessor system, individual processors must work cooperatively. For this purpose, each processor may request a status message from another processor, or request some processing thereto. A so-called inter-processor communication instruction is used to implement such a function.

The system of this type includes a service processor which performs maintenance servicing of other processors, as well as serving as a console or the like.

In the system of this type, a single processor can control all the other processors by sending a processing request to the other processors simultaneously, using a common inter-processor communication instruction (to be called a 1:n inter-processor communication instruction hereinafter). In this case, a single processor outputs the common inter-processor communication instruction onto a system bus. The other processors connected to the system bus receive this instruction at substantially the same time and perform the requested processing. The operation rates of the processors are thus substantially the same.

The 1:n inter-processor communication requires n interfaces for processing responses from n processors. However, the interfaces are provided to regular processors in the system, but not provided to the service processor. Thus, it is impossible to send a simultaneous processing request from the service processor to the other processors. Therefore, the service processor must sequentially send inherent inter-processor communication instructions (to be called 1:1 inter-processor communication instructions hereinafter) corresponding to the respective processors to sequentially control them. In this case, processing timings of the respective processors differ. In addition, since the operation rate of the service processor is lower than that of the regular processors, the lag in operation timings is increased.

On the other hand, providing an interface in the service processor results in bulky hardware, complicated control, and increased cost.

In a multiprocessor system adopting a split bus control method, a system bus is released every one bus cycle. During processing requested by the inter-processor communication instruction, data are shuttled between the corresponding processors (that is, several requests for obtaining the system bus are established). Therefore, before the processing associated with a given inter-processor communication instruction is completed, a processor may receive another inter-processor communication instruction. Such a problem may not frequently occur. However, each processor requires complicated hardware and firmware to avoid the above contention.

SUMMARY OF THE INVENTION

It is an object of the present invention to provide a multiprocessor system in which a simultaneous processing request from a service processor to all the other processors can be performed without increasing system hardware.

It is another object of the present invention to provide a multiprocessor system which can prevent contention caused by a plurality of inter-processor communication instructions from a plurality of processors, and which can reduce system hardware and simplify firmware in a service processor and other processors in the system.

According to the present invention, when a service processor requests processing by one processor in the system, individual processors can execute requested processing at substantially the same time, as if the service processor itself had simultaneously requested processing by all the processors, without increasing system hardware.

In addition, since contention caused by a plurality of inter-processor communication instructions can be eliminated, hardware and software for arbitrating the contention caused by the service processor and/or any other processors can be omitted.

BRIEF DESCRIPTION OF THE DRAWINGS

Other objects and features of the present invention will be apparent from the following description taken in conjunction with the accompanying drawings, in which.

DETAILED DESCRIPTION OF THE PREFERRED EMBODIMENT

Figure 1:
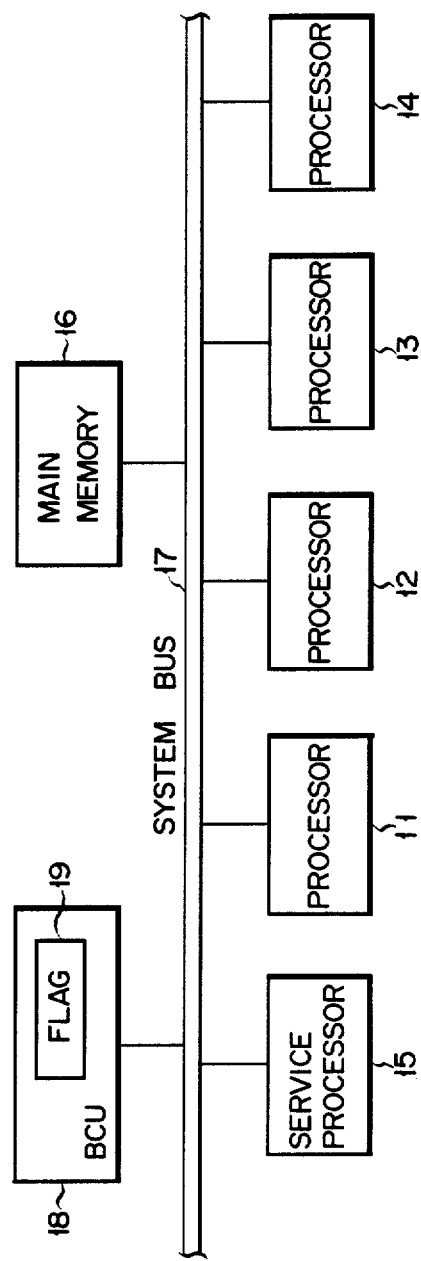
FIG. 1 is a block diagram of a multiprocessor system according to an embodiment of the present invention.

FIG. 1 is a block diagram of a multiprocessor system according to an embodiment of the present invention. Service processor 15 includes microprogram FWa for requesting processing to all of processors 11 through 14, and processor 11 includes microprogram FWb for receiving the processing requests from service processor 15 and the other system processors 12 through 14. Processors 12 through 14 also include the same microprogram FWb as in processor 11. System bus 17, adopting a split bus control method, interconnects processors 11 through 14, service processor 15, main memory 16, and bus control unit (to be referred to as BCU hereinafter) 18 for controlling system bus 17. BCU 18 is provided with flag 19 for indicating whether or not an inter-processor communication instruction is issued.

Figure 2A:
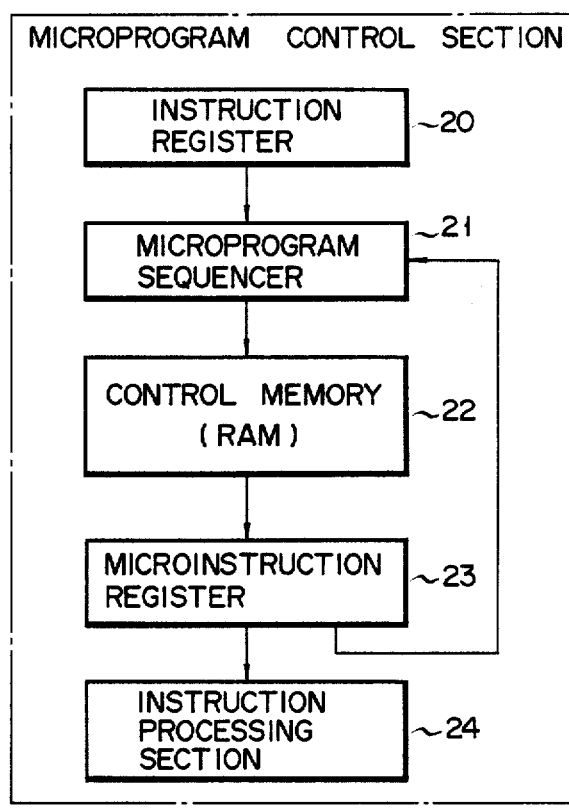
FIG. 2A is a block diagram showing the construction of a microprocessor control section provided within service processor 15 and processors 11, 12, 13 and 14.

FIG. 2A shows the construction of a microprogram control section provided in service processor 15 and each of processors 11 through 14. An operation code is set in instruction register 20. Then, the operation code is output to microprogram sequencer 21. Microprogram sequencer 21 generates and outputs to control memory 22 microinstruction address corresponding to the operation code, based on the branch address from microinstruction register 23. Control memory 22 stores a microprogram consisting of a plurality of microinstructions. The microinstruction read out from control memory 22 is output to microinstruction register 23. Then, the microinstruction is executed by instruction processing section 24.

Figure 2B:
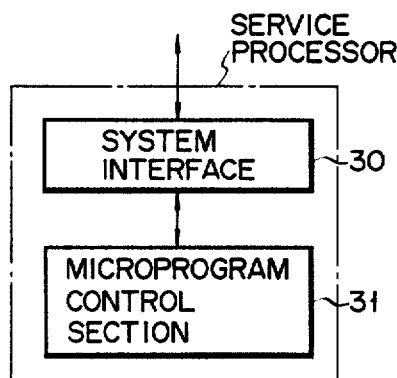
FIG. 2B is a block diagram showing the construction of a connection interface between service processor 15 and the system bus.

FIG. 2B shows a construction of a connection interface between service processor 15 and system bus 17.

Note that a data bus and an address bus are omitted in FIG. 2B. As apparent from FIG. 2B, service processor 15 and system bus 17 are connected through a single interface line.

Figure 2C:
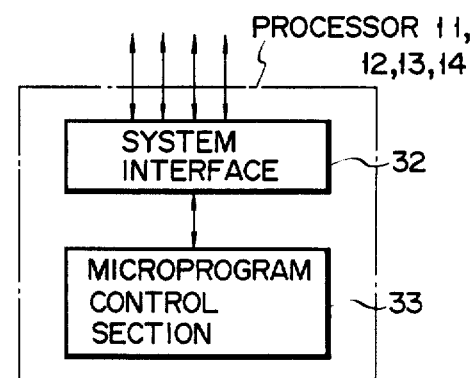
FIG. 2C is a block diagram showing the construction of a connection interface between processors 11 through 14 and the system bus.

FIG. 2C shows a construction of a connection interface between processors 11 through 14 and system bus 17. Also, in this figure the data bus and address bus are omitted. As apparent from FIG. 2C, processors 11 through 14 and system bus 17 are connected through a plurality of interface lines.

Figure 3:
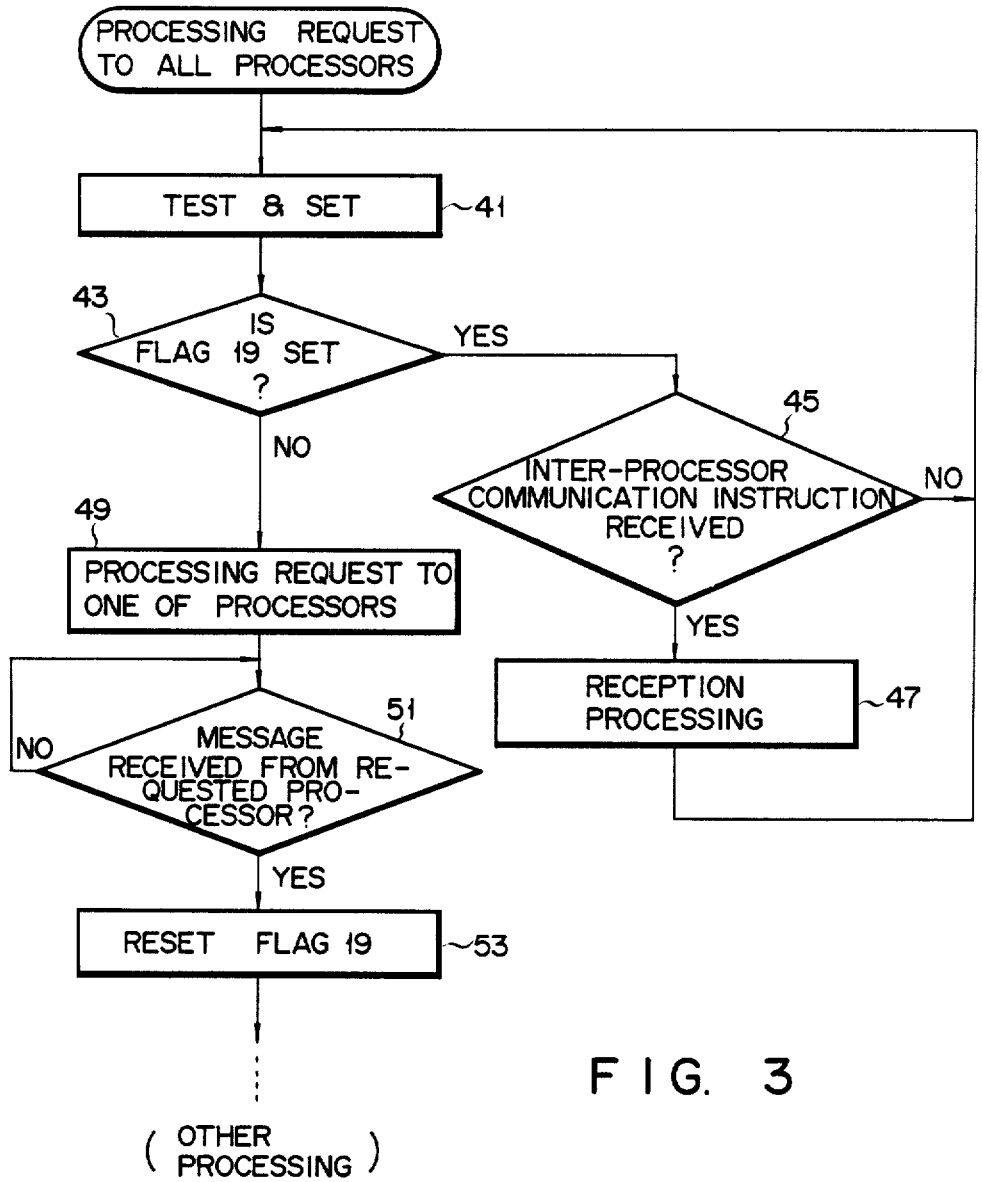
FIG. 3 is a flowchart showing the processing operation executed by microprogram control section 31 in service processor 15 according to the present invention.
Figure 4:
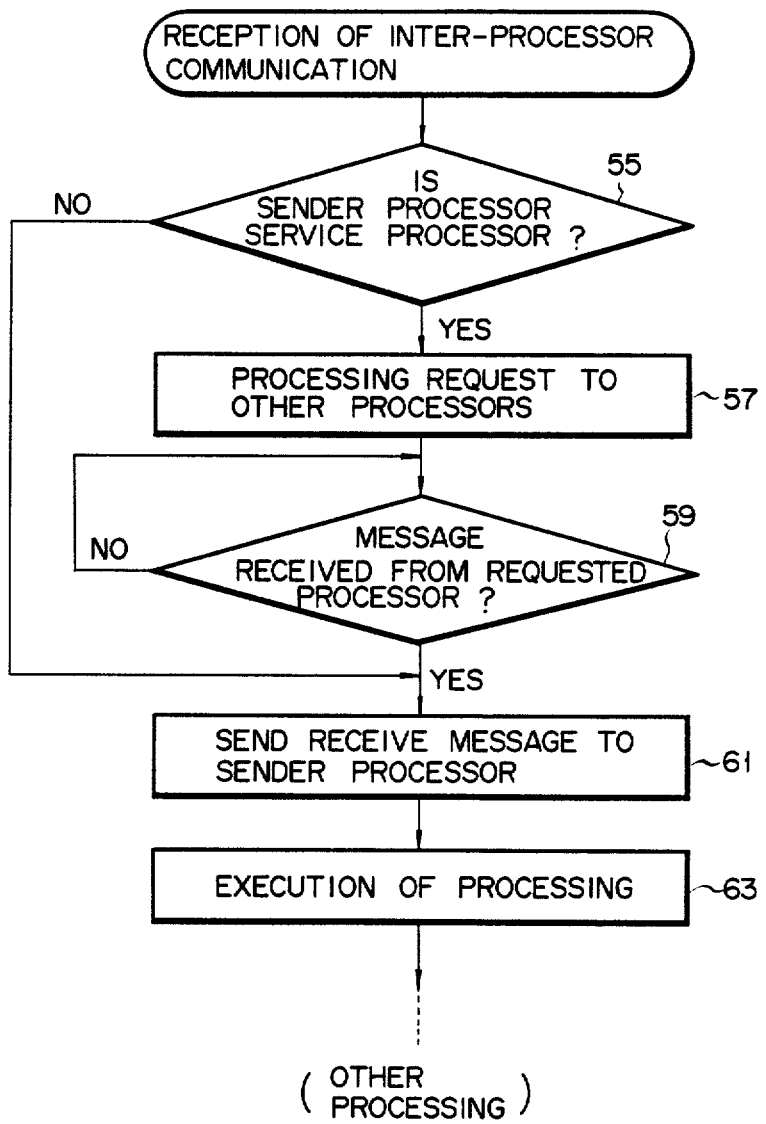
FIG. 4 is a flowchart showing the processing operation executed by microprogram control section 33 in a selected processor (one of processors 11 through 14).

The operation of the system of this embodiment will now be described with reference to FIGS. 2 through 4. A case will be described wherein service processor 15 requests processing to all of processors 11 through 14.

Service processor 15 executes a TEST & SET instruction with respect to flag 19 in BCU 18, under the control of microprogram FWa provided in the microprogram control section (step 41). TEST & SET instruction sets flag 19 if flag 19 has been reset, and notifies the processor which issued a 1:1 inter-processor communication instruction (in this embodiment service processor 15) that flag 19 has been reset. However, if flag 19 has already been set, flag 19 is left unchanged, and the processor which is the source of the 1:1 inter-processor communication instruction (in this embodiment, service processor 15 itself) is notified that flag 19 has already been set.

After executing the TEST & SET instruction, service processor 15 discriminates whether flag 19 has been set (step 43). If YES in step 43, processor 15 determines that one of the other processors is issuing or is about to issue a 1:n inter-processor communication instruction, and interrupts issuing of the 1:1 inter-processor communication instruction. The processor which, by setting flag 19, interlocked the issuing of the 1:1 inter-processor communication instruction by the service processor may issue 1:1 inter-processor communication instruction to the service processor 15.

Therefore, service processor 15 checks whether the 1:1 inter-processor communication instruction has been received by itself (step 45). If YES in step 45, service processor 15 executes 1:1 inter-processor communication reception processing (step 47).

However, if NO in step 45, or if reception processing in step 47 is completed service processor 45 returns to TEST & SET processing in step 41, and repeats the above operation until flag 19 is reset, i.e., interlocking of the 1:1 inter-processor communication instruction is released.

If flag 19 is reset, i.e., if NO in step 43, service processor 15 determines that issuance of the 1:1 inter-processor communication instruction is allowed, and issues the 1:1 inter-processor communication instruction to one of processors 11 through 14 (e.g., processor 11), thereby requesting processing such as start or stop of processor (step 49). Service processor 15 then awaits a request reception message from this processor (step 51).

Assume that the 1:1 inter-processor communication instruction issued from service processor 15 is received by processor 11. Upon reception of this instruction, processor 11 executes reception processing under the control of microprogram FWb provided in microprogram control section 33. During reception processing, processor 11 checks if service processor 15 has issued this instruction (step 55).

In this embodiment, as stated previously, the issuing processor is service processor 15. However, if NO in step 55, processor 11 sends back a receive message (request reception) of the 1:1 (or 1:n) inter-processor communication instruction to the issuing processor (step 61), and executes processing in accordance with the received instruction (step 63).

In contrast to this, when the issuing processor is service processor 15, as in this embodiment, processor 11 issues, in place of service processor 15, a 1:n interprocessor communication instruction to other processors 12 through 14 to request the same processing as that requested by service processor 15 (step 57).

Each of processors 12 through 14 receiving the processing request from processor 11 includes the same microprogram as microprogram FWb of processor 11. In this case, since the issuing processor is not service processor 15 but processor 11, processors 12 through 14 send back reception messages of the 1:n inter-processor communication instruction to processor 11, and then execute the requested processing.

After processor 11 issues processing requests to other processors (processors 12 through 14), it awaits request reception messages therefrom (step 59). When processor 11 receives, through a plurality of interface lines, the request reception messages from processors 12 through 14, the flow advances to step 61, and processor 11 sends back a reception message of the 1:1 interprocessing communication instruction to service processor 15 as the issuing processor. Thereafter, processor 11 executes the requested processing (step 63).

As described above, when service processor 15 having only a 1:1 inter-processor communication function must request processing to all of processors 11 through 14, it requests the processing to only one of processors 11 through 14 (in this embodiment, processor 11). Processor 11 then issues the processing request onto the other processors (in this embodiment, processors 12 through 14) using a 1:n inter-processor communication function, in place of service processor 15. Thus, processors 11 through 14 can execute the same processing at substantially the same time, as if service processor 15 had simultaneously requested the processing thereto.

Upon receiving the request reception message from processor 11 (step 61), service processor 15 resets flag 19 (step 53) and ends all of the processing.

In this embodiment, after processors 11 through 14, which receive the processing request from service processor 15 directly or indirectly, initiate the requested processing, service processor 15 resets flag 19. Therefore, during this interval, since issuance of another request (inter-processor communication instruction) is inhibited, there is no possibility of contention between a plurality of requests.

Next, a case will be described wherein one of processors 11 through 14 requests processing to the other processors, independently of a request from service processor 15.

Processors 11 through 14 have substantially the same microprogram as microprogram FWa in service processor 15. However, a difference therebetween is that the processing request can be made not only by processors 11 through 14 but also by service processor 15. When one of processors 11 through 14 requests processing to one or all of other processors 11 through 14 independently of service processor 15, the corresponding processor executes TEST & SET processing as in processor 15. More specifically, if flag 19 has been reset, the corresponding processor sets it.

As a result, issuance of a 1:1 or 1:n inter-processor communication instruction from other processors is interlocked. In this state, the corresponding processor issues the 1:1 or 1:n inter-processor communication instruction, and requests processing to destination processors (receivers of the instruction). Destination processors (processors 11 through 14) send back a reception message acknowledging the request to the source processor (one of processors 11 through 14; issuer of the instruction). When the source processor receives the reception messages, it resets flag 19. In this way, when one of processors 11 through 14 as the source processor requests processing by remaining processors 11 through 14 (destination processors) and the destination processors execute the processing, the processing request will not be in contention with a request from another processor.

As has been described above, when service processor 15 receives the reception message acknowledging the processing request, it resets flag 19, as shown in steps 51 and 53. As a result, interlocking of inter-processor communication is released. In this case, processor 11 must set flag 19 to interlock issuance of inter-processor communication instructions from other processors. Therefore, other processors 12 through 14 may execute the inter-processor communication instruction during interlocking. In this case, processing requested by service processor 15 can be executed in the wrong order. Alternatively, if processor 11 sends back the request reception message to service processor 15 immediately after it receives the 1:1 inter-processor communication instruction therefrom, service processor 15 completes its processing before remaining processors 11 through 14 receive the processing request from processor 11. In this case, even if errors occur in processors 12 through 14, service processor 15 cannot detect this.

However, in this embodiment, when processor 11 receives the 1:1 inter-processor communication instruction, if the source processor is service processor 15, processor 11 replaces processor 15, and issues the 1:n inter-processor communication instruction to request processing by the destination processors. When processor 11 receives the request reception messages from the destination processors, it sends back the request reception message to service processor 15. Therefore, the processing requested by service processor 15 first will not be executed in the wrong order.

What is claimed is:

1. A method for controlling a multiprocessor system having n processors (where n is a positive integer), a service processor, and a system bus comprising:
    (a) interconnecting said n processor and said service processor using a split bus control method;
    (b) controlling said system bus to exchange data thoughout said system;
    (c) issuing a 1:1 inter-processor communication instruction to selected ones of said n processors from said service processor;
    (d) issuing a 1:n inter-processor communication to the remaining processor from said processor which has received the 1:1 inter-processors communication instruction from said service processor; and
    (e) storing flag information having a first and second logic state in a bus control unit for controlling the execution of the 1:1 inter-processor communication instruction and the 1:n inter-processor communication instruction.

2. A method according to claim 1, wherein the step of issuing a 1:1 inter-processor communication includes executing a test and set instruction in said service processor for reading the stored flag information and setting the flag information to a second logic state at times when the flag information designates a first logic state prior to issuing the 1:1 inter-processor communication instruction.

3. A method according to claim 2, wherein said step of issuing a 1:1 inter-processor communication includes ceasing to issue the 1:1 inter-processor communication instruction at times when the flag information has already been set to the second logic state.

4. A method according to claim 1, wherein the steps of issuing a 1:n inter-processor communication to the remaining processors includes acknowledging that the received instruction has been issued from said service processor.

5. A method according to claim 1, wherein said step of issuing a 1:n inter-processor communication to the remaining processors includes a means for sending a response signal to said service processor when receiving a processing-request reception message from said remaining processors.

6. A method according to claim 5, wherein said step of sending a response signal to said service processor includes setting the flag information from the second logic state to the first logic state.

* * * * *

UNITED STATES PATENT AND TRADEMARK OFFICE
CERTIFICATE OF CORRECTION

PATENT NO. : 4,740,910
DATED : April 26, 1988
INVENTOR(S) : Sakata et al.

It is certified that error appears in the above-identified patent and that said Letters Patent is hereby corrected as shown below:

Title Page, under "Inventors:" change "Junihiko Sakata" to --Kunihiko Sakata--.

Signed and Sealed this

Twenty-seventh Day of September, 1988

Attest:

DONALD J. QUIGG

*Attesting Officer*  *Commissioner of Patents and Trademarks*